US006985971B2

(12) United States Patent
Wang et al.

(10) Patent No.: US 6,985,971 B2
(45) Date of Patent: Jan. 10, 2006

(54) TESTING METHOD OF ARRAY CONFIGURATION FOR MULTIPLE DISK-ARRAY SYSTEM

(75) Inventors: Jerry Wang, Taipei (TW); Wilson Hu, Taipei (TW)

(73) Assignee: Via Technologies Inc., Taipei (TW)

( * ) Notice: Subject to any disclaimer, the term of this patent is extended or adjusted under 35 U.S.C. 154(b) by 192 days.

(21) Appl. No.: 10/626,646

(22) Filed: Jul. 25, 2003

(65) Prior Publication Data
US 2004/0158763 A1 Aug. 12, 2004

(30) Foreign Application Priority Data
Dec. 12, 2002 (TW) .................................. 91135915

(51) Int. Cl.
*G06F 12/00* (2006.01)
(52) U.S. Cl. .............................. 710/10; 710/74; 710/8; 711/114; 714/770; 714/6; 714/7
(58) Field of Classification Search .................... 710/8, 710/10, 62, 72, 74; 711/114, 110, 154.17; 714/5–7, 770
See application file for complete search history.

(56) References Cited

U.S. PATENT DOCUMENTS

| 5,822,782 | A  | * | 10/1998 | Humlicek et al. | ........... 711/170 |
| 5,950,230 | A  | * | 9/1999  | Islam et al. | .................... 710/10 |
| 6,327,672 | B1 | * | 12/2001 | Wilner | ........................... 714/6 |
| 6,742,081 | B2 | * | 5/2004  | Talagala et al. | ............. 711/114 |
| 6,799,284 | B1 | * | 9/2004  | Patel et al. | ..................... 714/6 |

* cited by examiner

*Primary Examiner*—Kim Huynh
(74) *Attorney, Agent, or Firm*—Rosenberg, Klein & Lee

(57) ABSTRACT

An array configuration testing method is proposed for multiple disk-array system containing at least one disk array. The method comprises steps of: reading array configuration; acquiring a quantity of disk drives in the array; reading the serial check sum of all disk drives in the array; and comparing the quantity of disk drives in the array and another quantity of disk drives deduced from the serial check sum of all disk drives in the array. The method further comprises steps of: acquiring the disk sequence/function of the array in the array configuration; comparing the disk sequence/function with another disk sequence/function deduced from the serial check sum of each disk drive in one array. The method cross-examines the serial check sum of each disk drive in the same array and the quantity of disk drives in the array as well as disk sequence/function record in order to check data integrity in the array configuration.

14 Claims, 4 Drawing Sheets

| Offset | Type | meaning |
|---|---|---|
| 0 | WORD | array signature |
| 2 | BYTE | version identification |
| 3 | 15bytes | array information/disk information |
| 18 | DWORD | serial check sum of array disk 0 |
| 22 | DWORD | serial check sum of array disk 1 |
| 26 | DWORD | serial check sum of array disk 2 |
| 30 | DWORD | serial check sum of array disk 3 |
| 34 | DWORD | serial check sum of array disk 4 |
| 38 | DWORD | serial check sum of array disk 5 |
| 42 | DWORD | serial check sum of array disk 6 |
| 46 | DWORD | serial check sum of array disk 7 |
| 50 | BYTE | serial check sum of array configuration |

FIG. 2 array information

| bit | array type | meaning | |
|---|---|---|---|
| 0-2 | Raid 0 | quantity of disk drives | |
| | Raid 1 | spare quantity of disk drives | |
| | Raid 0+1 | stripe quantity of disk drives | |
| | Span | quantity of disk drives | |
| 3 | all | array broken flag | |
| 4-7 | Raid 0 - Raid 7 | 0-7 | representative numeric value |
| | Span | 8 | |
| | Raid 0+1 | 9 | |
| 8-10 | all | array serial number | |
| 11-14 | including stripe disk drive | stripe size | |
| 15-46 | all | available capacity | |
| 47-63 | all | reserved bit | |

FIG. 3 disk information

| bit | array type | meaning | |
|---|---|---|---|
| 0 | all | boot | |
| 1 | all | enhanced | |
| 2-33 | all | serial check sum | |
| 34-38 | Raid 0 | sequence of stripe disk drive | sequence/ function field |
| 34-35 | Raid 1 | source, mirror, or spare disk drive | |
| 36 | Raid 1 | synchronization | |
| 34-36 | Raid 0+1 | sequence of stripe disk drive | |
| 37 | Raid 0+1 | source array or mirror array | |
| 38 | Raid 0+1 | synchronization | |
| 34-36 | Span | sequence of disk drive | |
| 39-55 | all | reserved bit | |

FIG. 4

TESTING METHOD OF ARRAY CONFIGURATION FOR MULTIPLE DISK-ARRAY SYSTEM

BACKGROUND OF THE INVENTION

1. Field of the Invention

The present invention relates to an array configuration testing method for managing disk drive in disk array, more particularly to an array configuration testing method cross-testing the serial check sum of each disk drive in the same array and the quantity of disk drives in the array as well as disk sequence/function record in order to check data integrity in the array configuration.

2. Description of Related Art

The rapid market growth of information products has urged the development of new technologies and new specifications in information industry. As to data storage device, the data transfer rate and data safety are important issues. Therefore, RAID (redundant array of independent disk drive) is proposed to meet above demands. RAID 0 (Redundant Arrays of Inexpensive Disks level 0) array provides the function of data striping to boost the data access speed. RAID 1 array provides the function of data mirroring to ensure security and safety of data storage and system stability. In addition, RAID 0+1 array, a combination of RAID 0 array plus RAID 1 array, has advantages in both data transfer speed and data security.

FIG. 1 shows the schematic diagram of a multiple disk-array system. The multiple disk-array system comprises a computer 32 connected to a plurality of disk arrays of various types and a plurality of independent disk drives 191 and 193 in a span array through an interface card 14. The plurality of disk arrays includes a first disk array 16, a second disk array 17 and a third disk array 18.

The first disk array 16 is a RAID 0 array which includes a first stripe disk drive 161 and a second stripe disk drive 163. The second disk drive array 17 is a RAID 0+1 array, which comprises a first stripe disk drive 171, a second stripe disk drive 173, a first mirror disk drive 175, and a second mirror disk drive 177. The third disk drive array 18 is a RAID 1 array, which comprises a source disk drive 181, a mirror disk drive 183, and a spare disk drive 185.

To access data in the disk drives of the disk arrays or the span array, the computer 12 firstly finds an accessing address of the data in corresponding disk drive, and then accesses the disk drives of the disk arrays or the span array through the adaptor card 14.

Dealing with such an enormous architecture, correctness of array configuration will be very important; a minute mistake will cause serious damage to the whole system.

SUMMARY OF THE INVENTION

It is an object of the invention to provide an array configuration testing method for multiple disk-array system to provide more efficient testing for disk array.

In one aspect of the invention, the method cross-examines the disk information and the array information recorded in the array configuration to check data integrity in the array configuration.

In another aspect of the invention, the method checks the quantity of disk drives recorded in the array configuration with the quantity of disk drives deduced from the serial check sum of each disk drive in the same array.

In still another aspect of the invention, the method checks the disk sequence by the disk sequence/function recorded in the array configuration with the disk sequence deduced from the serial check sum of each disk drive in the same array.

To achieve above object and aspect, the present invention provides an array configuration testing method for multiple disk-array system. The multiple disk-array system contains at least one disk array. Each array has at least one disk drive with an array configuration, wherein the array configuration comprises array quantity of disk drives, a disk sequence/function and serial check sum of every disk drive in the same disk array. The array configuration testing method comprises steps of: reading array configuration; acquiring a quantity of disk drives in the array; reading the serial check sum of all disk drives in the array; and comparing the quantity of disk drives in the array and another quantity of disk drives deduced from the serial check sum of all disk drives in the array.

To achieve above object and aspect, the present invention provides an array configuration testing method for multiple disk-array system. The multiple disk-array system contains at least one disk array. Each array has at least one disk drive with an array configuration, wherein the array configuration comprises array quantity of disk drives, a disk sequence/function and serial check sum of every disk drive in the same disk array. The serial check sums of the disk drives in the same disk array are arranged in an order according to a sequence and a function of the disk drives. The array configuration testing method comprises steps of: reading array configuration; acquiring the disk sequence/function of the array in the array configuration; reading the serial check sum of all disk drives in the array; and comparing the disk sequence/function in the array and another disk sequence/function deduced from the serial check sum of all disk drives in the array.

The various objects and advantages of the present invention will be more readily understood from the following detailed description when read in conjunction with the appended drawing, in which:

BRIEF DESCRIPTION OF DRAWING

FIG. 2 shows the array configuration;

FIG. 3 shows the array information;

FIG. 4 shows the disk information;

DETAILED DESCRIPTION OF THE INVENTION

Figure 1:
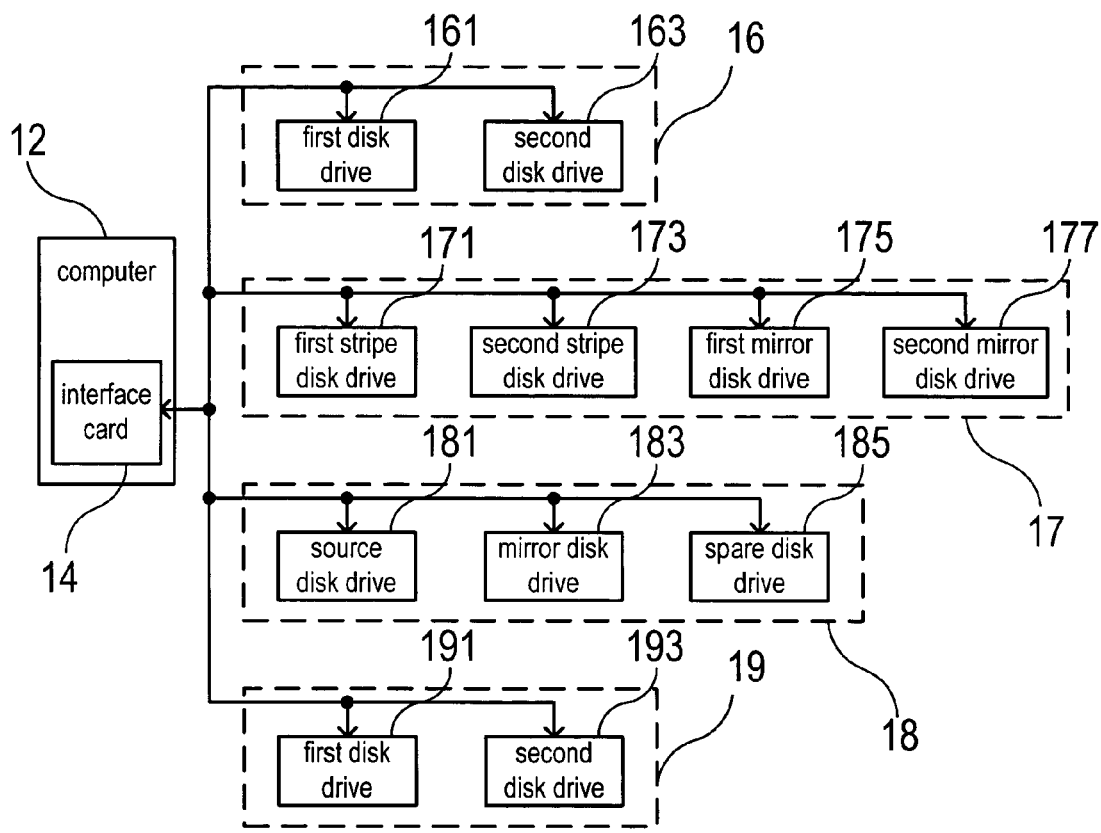
FIG. 1 shows a schematic block diagram of a multiple disk-array system.

FIGS. 2, 3, and 4 show the array configuration, the array information and the disk information according to the present invention, respectively.

In the array configuration testing method according to the present invention, the array data and the disk drive data in the array configuration are cross-examined to check the correctness of array configuration. The array configuration comprises at least array quantity of disk drives, a disk sequence/function and serial check sum of every disk drive in the same disk array. The serial check sums of the disk drives in the same disk array are arranged in an order according to the sequence and function of the disk drives.

As shown in FIG. 2, the array configuration mainly comprises an array signature, a version identification, an array information/disk information, serial check sum of every disk drive in the same disk array, and a serial check sum of the array configuration.

The array signature is stored in offset 0 position of the array configuration with the data type of one word (16 bits). The version identification is stored in offset 2 position of the array configuration with the data type of one byte. The array information/disk information is stored in the offset 3 position of the array configuration with the data type of 15 bytes. The array information/disk information is used to record data and status of the disk array and the disk drives thereof.

The serial check sum of each disk drive in the same disk array is stored in offset 18, 22, 26, 30, 34, 38, 42, 46 position of the array configuration with the data type of DWORD (double word, 32 bits). The serial check sum of each disk drive is obtained according to a numeration on the model number, serial number, and firmware revision number of the disk drive. The serial check sum of array configuration is stored in the offset 50 position of the array configuration with the data type of one byte, which is obtained according to operation on the entire array configuration to examine the correctness of the array configuration.

FIG. 3 and FIG. 4 respectively depict the array information of each disk array and the disk information of each disk drive in the array configuration in more detail.

In the array information, bits 0–2 denote the quantity of disk drives in one disk array, which can be directly expressed by numeric value or other record type according to various array types. In this preferred embodiment, the total quantity of disk drives is recorded for the RAID 0 array, the spare quantity of disk drives is recorded for the RAID 1 array, which can be used to estimate the total quantity of disk drives; the source stripe quantity of disk drives is recorded for the RAID 0+1 array, which can doubled to compute the total quantity of disk drives; the total quantity of disk drives is directly recorded for span array.

Bit 3 denotes an array broken flag, which is binary 1 to denote a normal disk array and is binary 0 to denote an abnormal disk array with removed or damaged disk. Bits 4–7 denote the array type, for example: RAID 0, RAID 1, . . . , RAID 7 is denoted by numeric values from 0 to 7, whereas other special arrays such as span or RAID 0+1 is denoted by numeric values like 8 or 9.

Bits 8–10 denote the serial number of each array in the disk system and are used to quickly identify the arrays in an array system. Bits 11–14 denote the size of recoded data stripe and utilize different numeric values to indicate different data units such as 4k, 8k, 16k, 32k, or 64k. The size of recoded data stripe should be recorded for RAID 0 or RAID 0+1 disk to prevent error. Bits 15–46 denote the available capacity of each disk drive in the disk array. Bits 47–63 are reserved bits for future use.

In disk information, bit 0 is a boot field for indicating bootable function. Bit 1 is an enhanced field. Bits 2–33 record the serial check sum of each disk drive.

Bits 34–38 denote the disk sequence/function for disk drive in the disk array. To be specific, in the RAID 0 or span array, it denotes the disk sequence in the array. In the RAID 1 array, bits 34–35 denote the disk drive being a source, mirror, or spare disk drive, and the bit 36 denotes the necessity for synchronization or not. In the RAID 0+1 array, bits 34–36 record the disk sequence in the stripe array; bit 37 denotes the location of the disk drive in the source stripe array or the mirror stripe array; the bit 38 denotes the necessity for synchronization or not. Moreover, bits 39–55 are reserved bits for future use.

Figure 5:
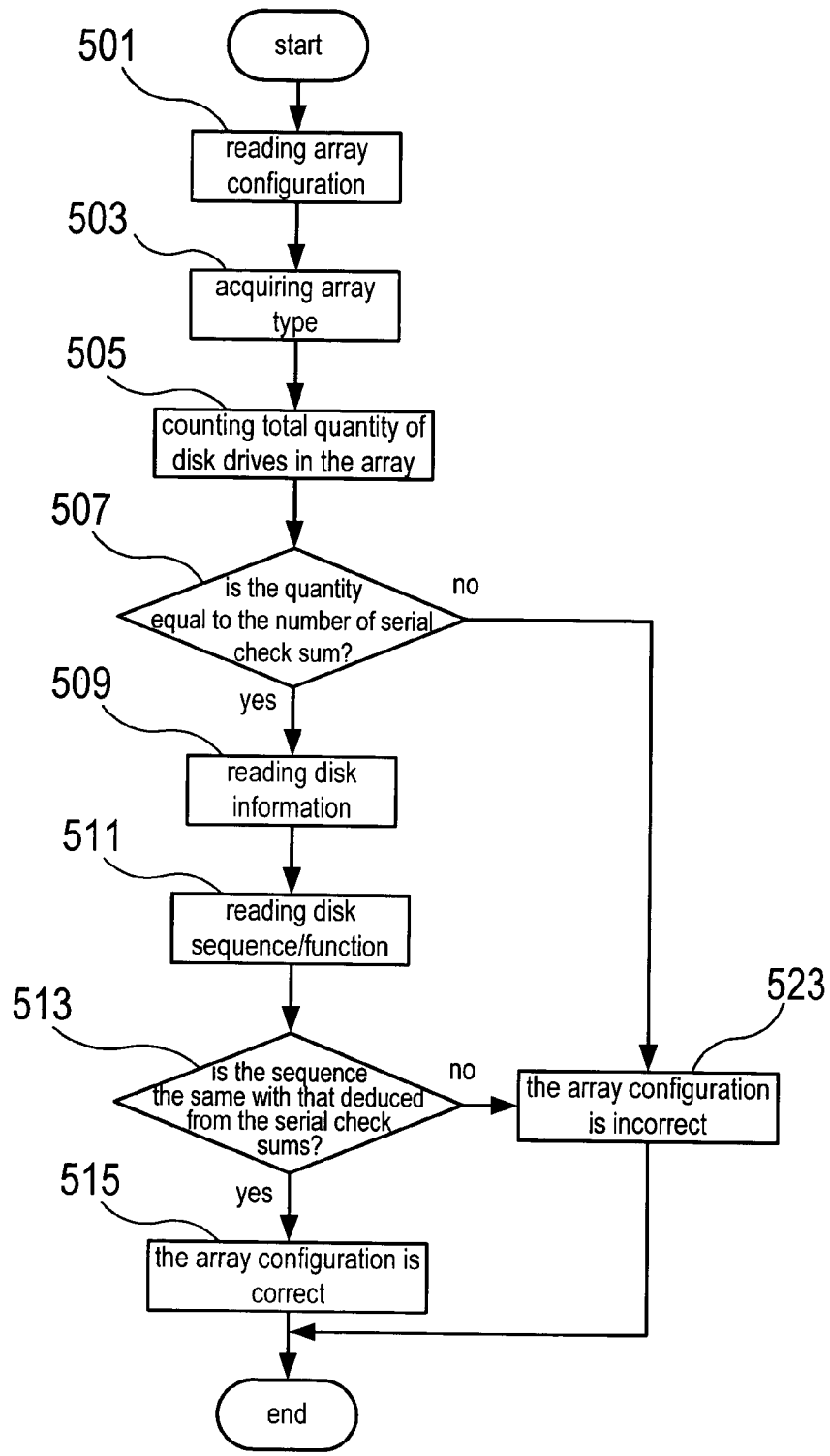
FIG. 5 shows a flowchart according to a preferred embodiment of the present invention.

FIG. 5 shows the flowchart of the disk drive managing method according to a preferred embodiment of the present invention. In a first step 501, the array information in the array configuration is read. The array type is identified to be RAID 0, RAID 1, RAID 0+1 or other in step 503. The numeric value for quantity of disk drives is read and the total quantity of disk drives in the array is counted according to known array type in step 505.

In a following step 507, from the array configuration, the number of serial check sum for disk drives in the array is compared with the total quantity of disk drives counted in step 505. If the two numbers are not matched, the array configuration is recognized to be incorrect in step 523. It means the array configuration needs modification. If the two numbers are matched, the array configuration passes first-stage testing and the disk information in the array configuration is read. Afterward, the disk sequence/function information are known by reading the disk sequence/function in the array configuration and the disk type information in step 511.

As mentioned above, the serial check sums of the disk drives in the same disk array are arranged in an order according to the sequence and function of the disk drives. The disk sequence/function information obtained in step 511 is compared with the disk sequence/function information deduced from the serial check sums in step 513. If these two information are not matched, the array configuration is recognized to be incorrect in step 523. If these two information are matched, the array configuration is recognized to be correct and to have normal function in step 515.

To sum up, array configuration testing method according to the present invention cross-examines the serial check sum of each disk drive in the same array and the quantity of disk drives in the array as well as disk sequence/function record. The data integrity in the array configuration can be efficiently checked.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. A testing method of array configuration for a multiple disk-array system, said testing method comprising steps of:
   providing an interface operable to access a plurality of disk-arrays coupled thereto, where data is distributed across each disk-array of said plurality of disk-arrays independently of said distribution across other disk-arrays of said plurality of disk-arrays;
   providing each disk drive of a corresponding disk-array of said plurality of disk-arrays with an array configuration structure, said array configuration structure including an indication of a number of disk drives in said corresponding disk-array and a serial check sum of each disk drive in said corresponding disk-array, said serial check sum of each said disk drive being arranged in said array configuration structure in accordance with a position and function of said disk drive in said corresponding disk-array;
   reading said array configuration structure;
   acquiring said indication of said number of disk drives from said array configuration structure and computing therefrom a corresponding number of disk drives;
   reading every said serial check sum in said array configuration structure; and comparing said number of disk drives computed in said indication acquiring step with a number of disk drives determined from said serial check sum reading step.

2. The testing method as in claim 1, further comprising steps of:
providing said array configuration structure with a disk sequence/function record for a corresponding disk drive;
acquiring said disk sequence/function record from said array configuration structure; and
comparing said disk sequence/function record with a disk sequence/function determined from said serial check sum reading step.

3. The testing method as in claim 1, wherein said serial check sum of each said disk drive is obtained according to a numeration on a model number, a serial number, and a firmware revision number of said disk drive.

4. The testing method as in claim 1, wherein said array configuration structure further comprises an array type indicative of a recording method of a corresponding number of disk drives, said array configuration structure further including a quantity field corresponding to said recording method and indicative of said corresponding number of disk drives.

5. The testing method as in claim 4, wherein a number of disk drives is determined by:
reading said array type;
reading said quantity field; and
computing said number of disk drives from said quantity field associated with said array type.

6. The testing method as in claim 2, wherein said array configuration structure further comprises an array type indicative of a recording method of said disk sequence/function.

7. The testing method as in claim 6, wherein said disk sequence/function is determined by:
reading said array type;
reading said disk sequence/function record; and
calculating a disk sequence/function for each disk drive in accordance with said array type.

8. A testing method of array configuration for a multiple disk-array system, said testing method comprising steps of:
providing an interface operable to access a plurality of disk-arrays coupled thereto, where data is distributed across each disk-array of said plurality of disk-arrays independently of said distribution across other disk-arrays of said plurality of disk-arrays;
providing each disk drive of a corresponding disk-array of said plurality of disk-arrays with an array configuration structure, said array configuration structure including an indication of a number of disk drives in said corresponding disk-array, a disk sequence/function record, and a serial check sum of each disk drive in said corresponding disk-array, said serial check sum of each said disk drive being arranged in said array configuration structure in accordance with a position and function of said disk drive in said corresponding disk-array;
reading said array configuration structure;
acquiring said disk sequence/function record from said array configuration structure;
reading every said serial check sum in said array configuration structure; and
comparing said disk sequence/function record with a disk sequence/function determined from said serial check sum reading step.

9. The testing method as in claim 8, further comprising steps of:
acquiring said indication of said number of disk drives from said array configuration structure and computing therefrom a corresponding number of disk drives; and
comparing said number of disk drives with a number of disk drives determined from said serial check sum reading step.

10. The testing method as in claim 8, wherein said serial check sum of each said disk drive is obtained according to a numeration on a model number, a serial number, and a firmware revision number of said disk drive.

11. The testing method as in claim 8, wherein said array configuration structure further comprises an array type indicative of a recording method of said disk sequence/function.

12. The testing method as in claim 11, wherein said disk sequence/function in a specific array is determined by:
reading said array type;
reading said disk sequence/function record; and
calculating a disk sequence/function in accordance with said array type.

13. The testing method as in claim 8, wherein said array configuration structure further comprises an array type indicative of a recording method of a corresponding number of disk drives, said array configuration structure further including a quantity field indicative of said corresponding number of disk drives.

14. The testing method as in claim 13, wherein said recording method of said quantity of disk drives comprises steps of:
reading said array type;
reading said quantity field; and
computing said number of disk drives from said quantity field associated with said array type.

* * * * *